US 7,636,621 B2

(12) United States Patent
Lee et al.

(10) Patent No.: US 7,636,621 B2
(45) Date of Patent: Dec. 22, 2009

(54) PATH GUIDANCE METHOD FOR AUTONOMOUS MOBILE DEVICE

(75) Inventors: Shih-Ping Lee, Taichung County (TW); Yu-Liang Chung, Taipei (TW); Hung-Hsiu Yu, Changhua County (TW); Tung-Chuan Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 492 days.

(21) Appl. No.: 11/498,824

(22) Filed: Aug. 4, 2006

(65) Prior Publication Data

US 2008/0009984 A1    Jan. 10, 2008

(30) Foreign Application Priority Data

Jul. 7, 2006    (TW)    ............... 95124728 A

(51) Int. Cl.
*H02J 7/00* (2006.01)
*G06F 19/00* (2006.01)

(52) U.S. Cl. ............... 701/23; 701/2; 701/26; 318/568.12; 700/245

(58) Field of Classification Search .................. 701/23, 701/24, 2, 25, 26; 320/109; 318/587, 568, 318/11, 568.11; 700/245
See application file for complete search history.

(56) References Cited

U.S. PATENT DOCUMENTS

| | | | |
|---|---|---|---|
| 5,109,566 A | 5/1992 | Kobayashi et al. | |
| 5,220,263 A * | 6/1993 | Onishi et al. | ................. 318/587 |
| 5,646,494 A * | 7/1997 | Han | ............. 318/587 |
| 6,212,371 B1 | 4/2001 | Sakuma | |
| 6,389,329 B1 | 5/2002 | Colens | |
| 6,764,373 B1 | 7/2004 | Osawa et al. | |
| 6,785,545 B1 | 8/2004 | Murakami et al. | |
| 6,965,211 B2 | 11/2005 | Tsurumi | |
| 7,053,578 B2 * | 5/2006 | Diehl et al. | ............. 318/568.12 |
| 2004/0088081 A1 | 5/2004 | Song et al. | |
| 2004/0178767 A1 | 9/2004 | Jeon et al. | |
| 2004/0201361 A1 | 10/2004 | Koh et al. | |
| 2005/0010330 A1 * | 1/2005 | Abramson et al. | ........... 700/245 |
| 2005/0137748 A1 | 6/2005 | Kim | |
| 2005/0156562 A1 * | 7/2005 | Cohen et al. | ................. 320/107 |
| 2005/0231156 A1 | 10/2005 | Yan | |

FOREIGN PATENT DOCUMENTS

CN    2753802    1/2006

(Continued)

*Primary Examiner*—Tan Q Nguyen
(74) *Attorney, Agent, or Firm*—Birch, Stewart, Kolasch & Birch, LLP

(57) ABSTRACT

A path guidance method for autonomous mobile device, by which a directional wireless reception unit, arranged on the autonomous mobile device, is enabled to receive a radio wave guidance signal issued by a call unit while the direction pointing to the call unit can be determined with respect to the intensity and direction of the received radio wave guidance signal, and thus the autonomous mobile device is directed to move toward the pointing direction until the autonomous mobile device reaches a location specified by the call unit. In a preferred aspect, the autonomous mobile device is determined to be not far from the call unit when the intensity of the radio wave guidance signal, received by the directional wireless reception unit, is larger than a predefined value.

4 Claims, 6 Drawing Sheets

FOREIGN PATENT DOCUMENTS

| | | |
|---|---|---|
| CN | 1761554 | 4/2006 |
| JP | 2001-196976 A | 7/2001 |
| JP | 2001-197546 A | 7/2001 |
| JP | 2004-156998 A | 6/2004 |
| TW | 183693 | 5/1992 |
| TW | 250547 | 7/1995 |
| TW | 394882 | 6/2000 |

* cited by examiner

PATH GUIDANCE METHOD FOR AUTONOMOUS MOBILE DEVICE

FIELD OF THE INVENTION

The present invention relates to a path guidance method for an autonomous mobile device, and more particularly, to a path guidance method for an autonomous mobile device utilizing a radio wave guidance signal issued from a call unit for guiding the autonomous mobile device to move toward the call unit.

BACKGROUND OF THE INVENTION

With rapid advance of technology, modern robots of various varieties have finding their way of taking up more and more tasks ordinarily ascribed to humans, that they can be seen working in families for household cleaning, or working in factories for lifting/moving heavy objects, or even they can be seen playing important roles in outer space exploring.

Conventionally, in order to keep a mobile robot operational, it must return to a changer for charging before its power is running out. Please refer to FIG. 1, which is a functional block diagram of a conventional charging system for mobile robots. In FIG. 1, the charging system 1 is comprised of: a mobile robot 11; and a charger 12, including a charging control module 121 and an infrared emission module 122; wherein, the infrared emission module 122 is capable of issuing a plurality of infrared rays to be used by the mobile robot 11 as guidance for finding a path to the charger 12; and the charging control module 121 is used to specify and regulate the output power of the charger as well as the electrical characteristics thereof. By the aforesaid charging system 1, the path finding and guidance of the mobile robot 11 can be described as following: as the mobile robot 11 is operating in a area covered by the plural infrared rays of the infrared emission module 122 and when the power of the battery module 11 is dropping lower than a predefined value and is detected by the battery capacity inspection module 111, the battery capacity inspection module 111 will issue a signal to the control module 113 for directing the same to orientate and calibrate the position of the mobile robot 11 with respect to the direction of the infrared rays received by the infrared reception module 114, and thereby controlling the mobile module 115 to move the mobile robot 11 toward the charger 12 for charging. However, if there is an obstacle between the charger 12 and the mobile robot 11 that blocks the infrared rays to be received by the infrared reception module 114, the mobile robot 11 will have difficulty in finding the exact location of the charger 12 and thus a more complicated guidance design for overcoming such difficulty will be required.

Another conventional path finding and guidance method of mobile robot is achieved by the use of the calculation of encoders, arranged on the wheels of a mobile robot, to obtain the location of the mobile robot, However, as the slipping and idle spinning of the wheels might introduce error into the calculation, misguidance is a commonplace.

In yet another conventional path finding and guidance method of mobile robot, a plural reflective plates of the same shape are arranged on walls of an operation area of a mobile robot while being spaced from each other by the same interval, such that the mobile robot can use CCD cameras embedded therein to recognize the relative positioning of the plural reflective plates and thus evaluate the distance between itself and a charger accordingly. However, if the illumination of the operation area is changed or some other objects of the shape similar to that of the reflective plate are misidentified as the reflective plates, the distance can be erroneous. In addition, if the operation area is too bright or to dark, the CCD cameras might not be able to recognize those reflective plates that cause the guidance of the mobile robot impossible to be achieved. Moreover, since CCD cameras are required in the mobile robot, the manufacturing cost of the mobile robot is increased.

Therefore, it is in need of a path guidance method for an autonomous mobile device that is free from the aforesaid prior-art shortcomings.

SUMMARY OF THE INVENTION

The primary object of the present invention is to a path guidance method for autonomous mobile device, by which a directional wireless reception unit, arranged on the autonomous mobile device, is enabled to receive a radio wave guidance signal issued by a call unit while the direction pointing to the call unit can be determined with respect to the intensity and direction of the received radio wave guidance signal, and thus the autonomous mobile device is directed to move toward the pointing direction.

It is another object of the invention to provide a path guidance method for autonomous mobile device, capable of determining a distance between a call unit and the autonomous mobile device with respect to the intensity of a received radio wave guidance signal received thereby, and directing the autonomous mobile device to perform certain predetermined actions, such as reducing speed, turn, or standby, while the distance is smaller than a predefined value.

To achieve the above objects, the present invention provides a path guidance method capable of guiding an autonomous mobile device to a location specified by a call unit for enabling the autonomous mobile device to perform a predetermined operation thereat, whereas the autonomous mobile device is configured with a directional wireless reception unit while the call unit is configured with a wireless transmission unit, which comprises steps of:

(a) enabling the wireless transmission unit to issue a radio wave guidance signal;
(b) enabling the wireless reception unit to receive the radio wave guidance signal; and
(c) enabling the autonomous mobile device to evaluate and determine a moving direction with respect to the intensity and direction of the received radio wave guidance signal, and thus directing the autonomous mobile device to move accordingly.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
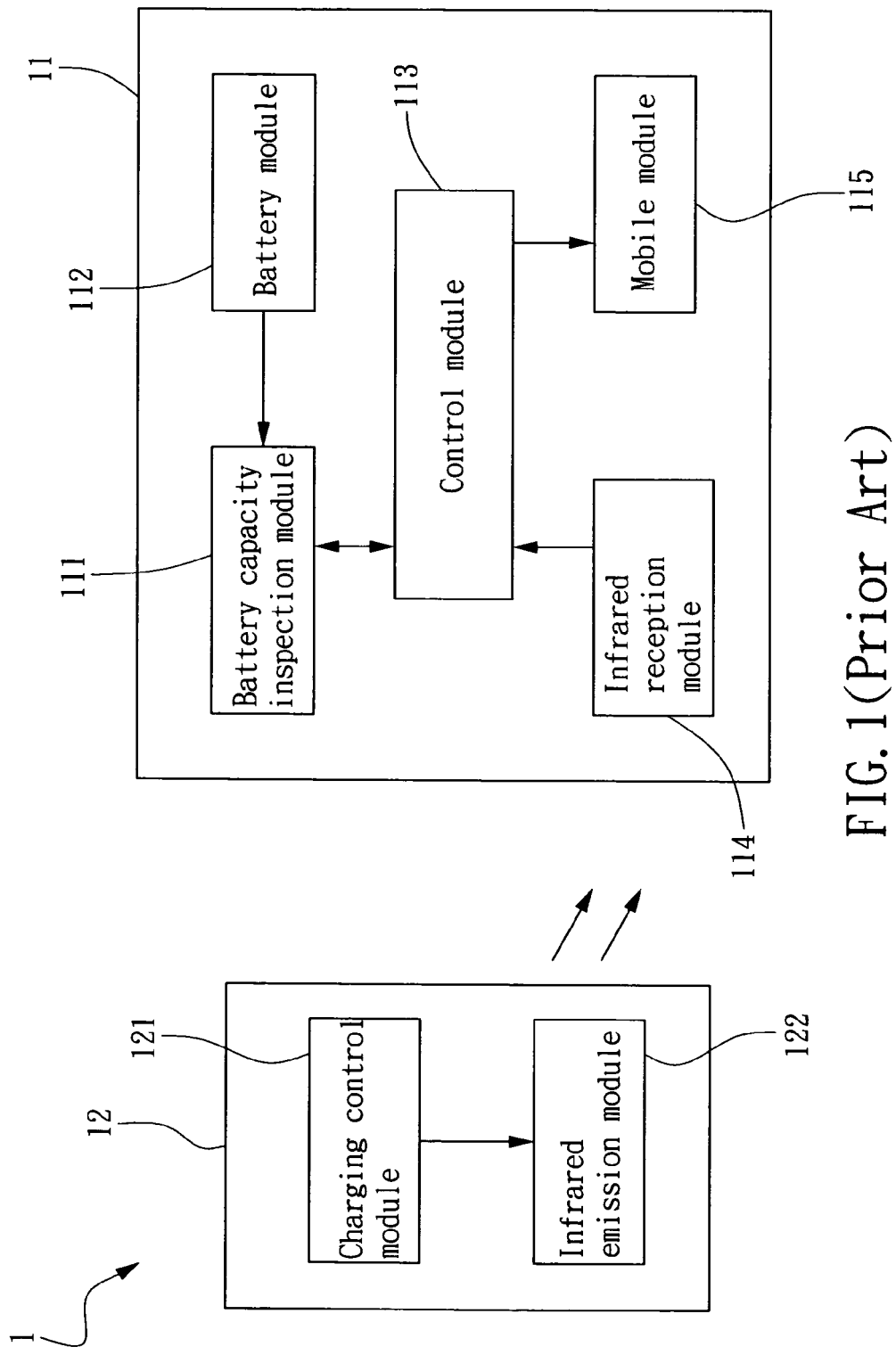
FIG. 1 is a functional block diagram of a charging system for a conventional mobile robot.
Figure 2:
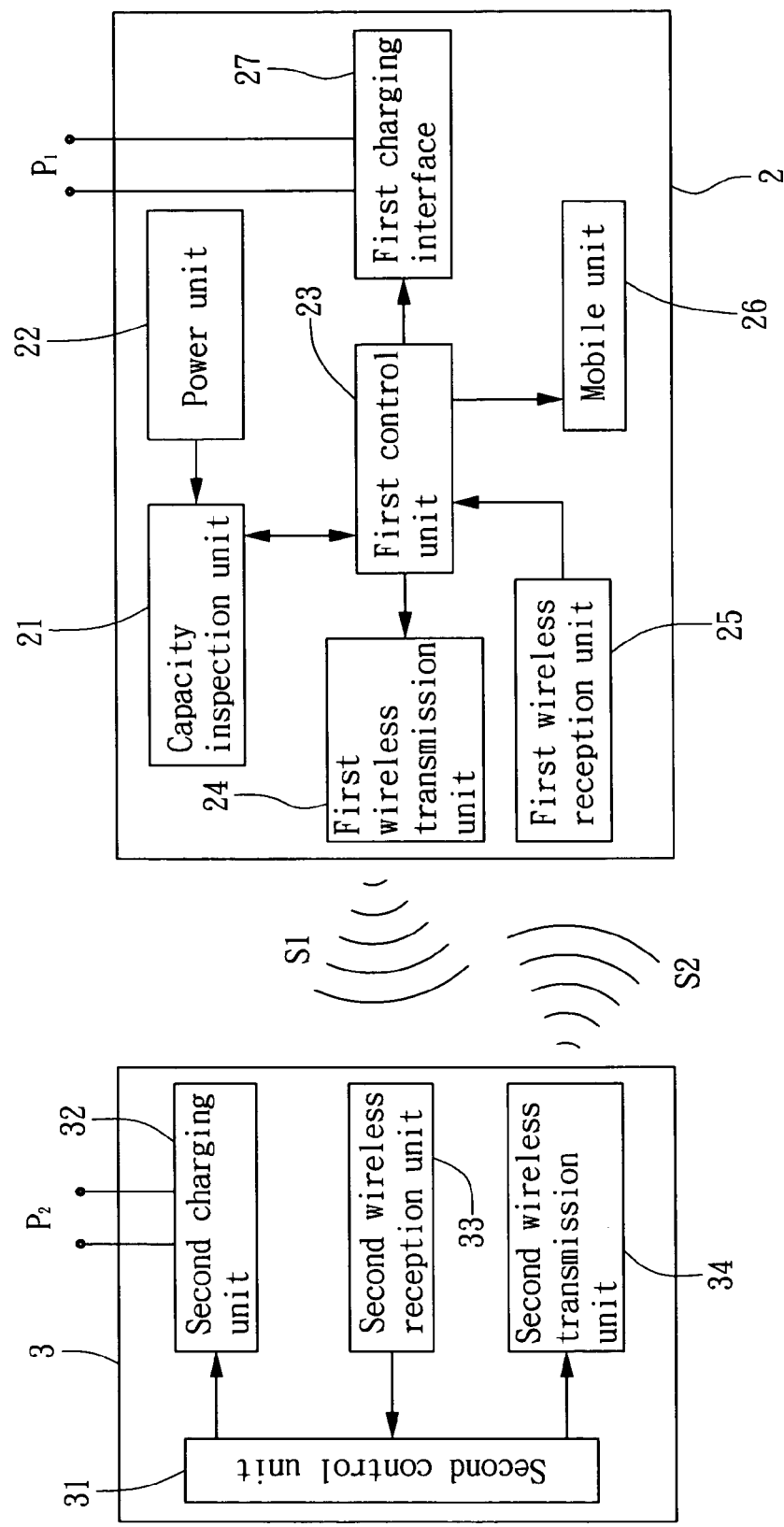
FIG. 2 is a functional block diagram of an autonomous mobile device with its changing station of the present invention.

Please refer to FIG. 2, which is a functional block diagram of an autonomous mobile device with its changing station according to the present invention. In FIG. 2, the autonomous mobile device 2 is comprises of: a capacity inspection unit 21, a power unit 22, a first control unit 23, a first wireless transmission unit 24, a first reception unit 25, a mobile unit 26 and a first charging interface 27; and the call unit 3 is comprised of: a second control unit 31, a second wireless transmission unit 32, a second wireless reception unit 33, and a second charging interface 34. The capacity inspection unit 21 is capable of detecting the power of the power unit 22 while transmitting the result of the inspection to the first control unit 23. As soon as the detection of the capacity inspection unit 21 shows that the power of the power unit 22 is too low and the first control unit 23 is informed of the detection result, the first control unit 23 will direct the first wireless transmission unit 24 to issue a first radio wave signal S1. As the first radio wave signal S1 is received by the second wireless reception unit 33, it is redirected to the second control unit 31 for enabling the same to command the second wireless transmission unit 32 to issue a second radio wave signal 52. Thereafter, as soon as the second radio wave signal S2 is received by the first wireless reception unit 25 and is redirected to the first control unit 23, the first control unit 23 will direct the mobile unit 26 to move toward the call unit 3. Therefore, as soon as the connection port P1 of the first charging interface 27 is in contact with the connection port P2 of the second charging interface 34 and by the cooperative operation of the first and the second control units 23, 31, the autonomous mobile device 2 is charged by the call unit 3.

Figure 3:
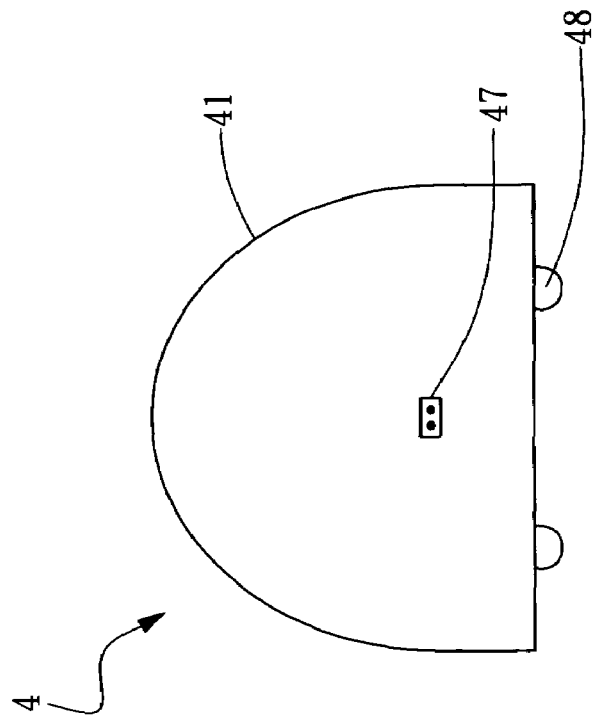
FIG. 3 is a top view of an autonomous mobile device according to a preferred embodiment of the invention.
Figure 4:
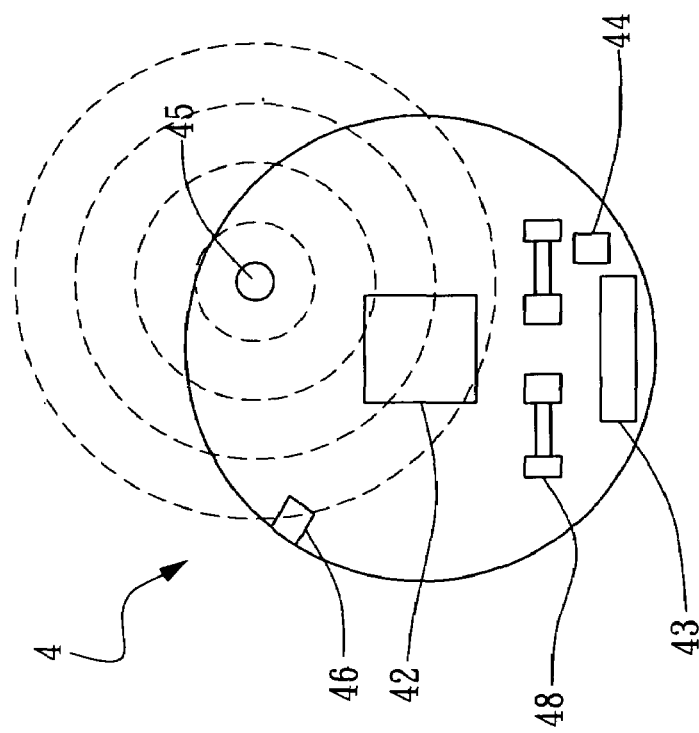
FIG. 4 is a schematic diagram illustrating the appearance of an autonomous mobile device according to a preferred embodiment of the invention.

Please refer to FIG. 3 and FIG. 4, which show respectively a top view and an appearance of an autonomous mobile device according to a preferred embodiment of the present invention. The an autonomous mobile device of FIG. 3 and FIG. 4 is substantially an autonomous vacuum machine 4, however, it is not limited thereby and can be any electronic device autonomous mobility. The autonomous vacuum machine 4 has a hull 41 made of a non-metal material, in which a first control unit 42, a battery 43, a low-voltage inspection unit 44 controlled by the control unit 42, and a directional antenna 46, are all arranged inside the hull 41. The directional antenna 46 is orientated to receive a radio wave signal at its maximum only from a specified direction. Moreover, a first charging interface 47, also controlled by the first control unit 42, is arranged on the hull 41, and two sets of rollers 48, being controlled by the first control unit 42, is arranged underneath the hull 41.

Figure 5:
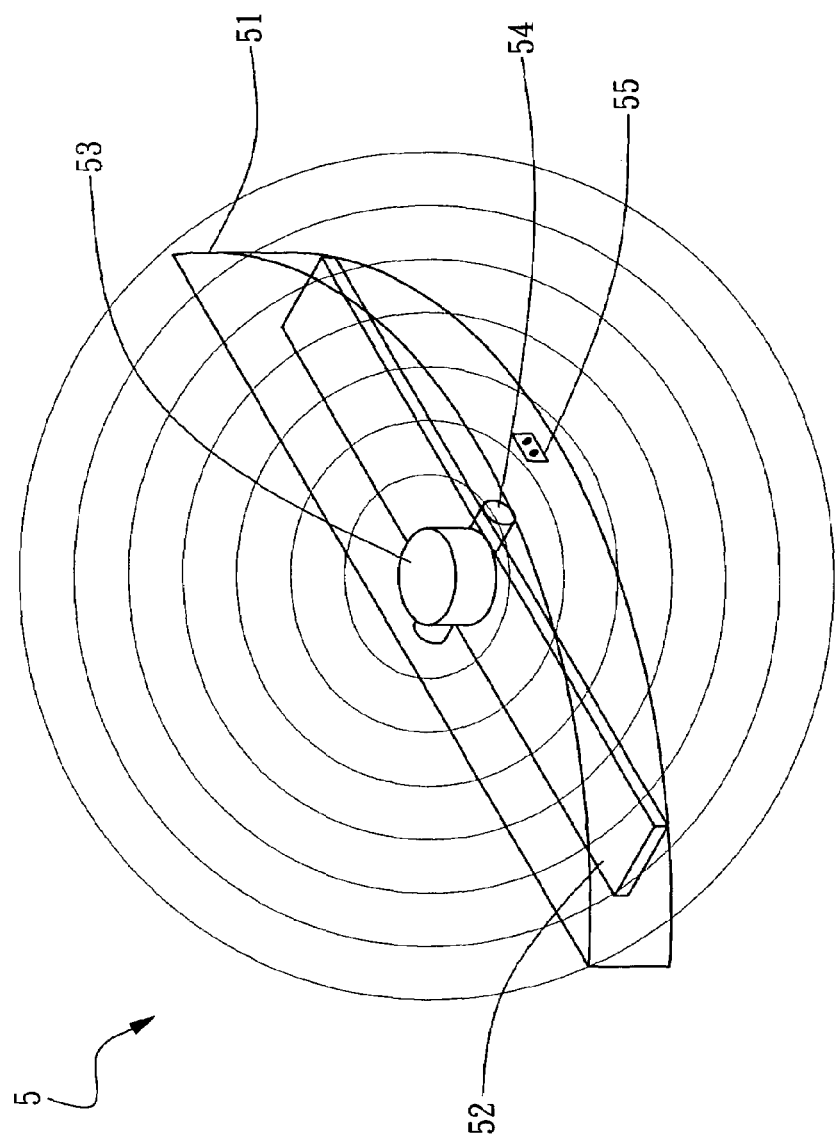
FIG. 5 is a perspective view of a charging station according to the present invention.

Please refer to FIG. 5, which is a perspective view of a charging station according to the present invention. As seen in FIG. 5, the call unit, being substantially a charging station 4, is a casing 51 with a second control unit 52, a second wireless transmission unit 53 controlled by the second control unit 52, and an omni-directional antenna 54, all being arranged therein. It is noted that the radio wave signal issued by the second wireless transmission unit 53, as those concentric circles of FIG. 5, is able to penetrate objects made of materials other than metals. In addition, a second charging interface 55, also controlled by the second control unit 52, is arranged on the casing 51. It is known to those skilled in the art that the operation of the autonomous vacuum machine 4 and the charging station 5 is similar to that shown in FIG. 2, and thus is not described further herein.

Figure 6:
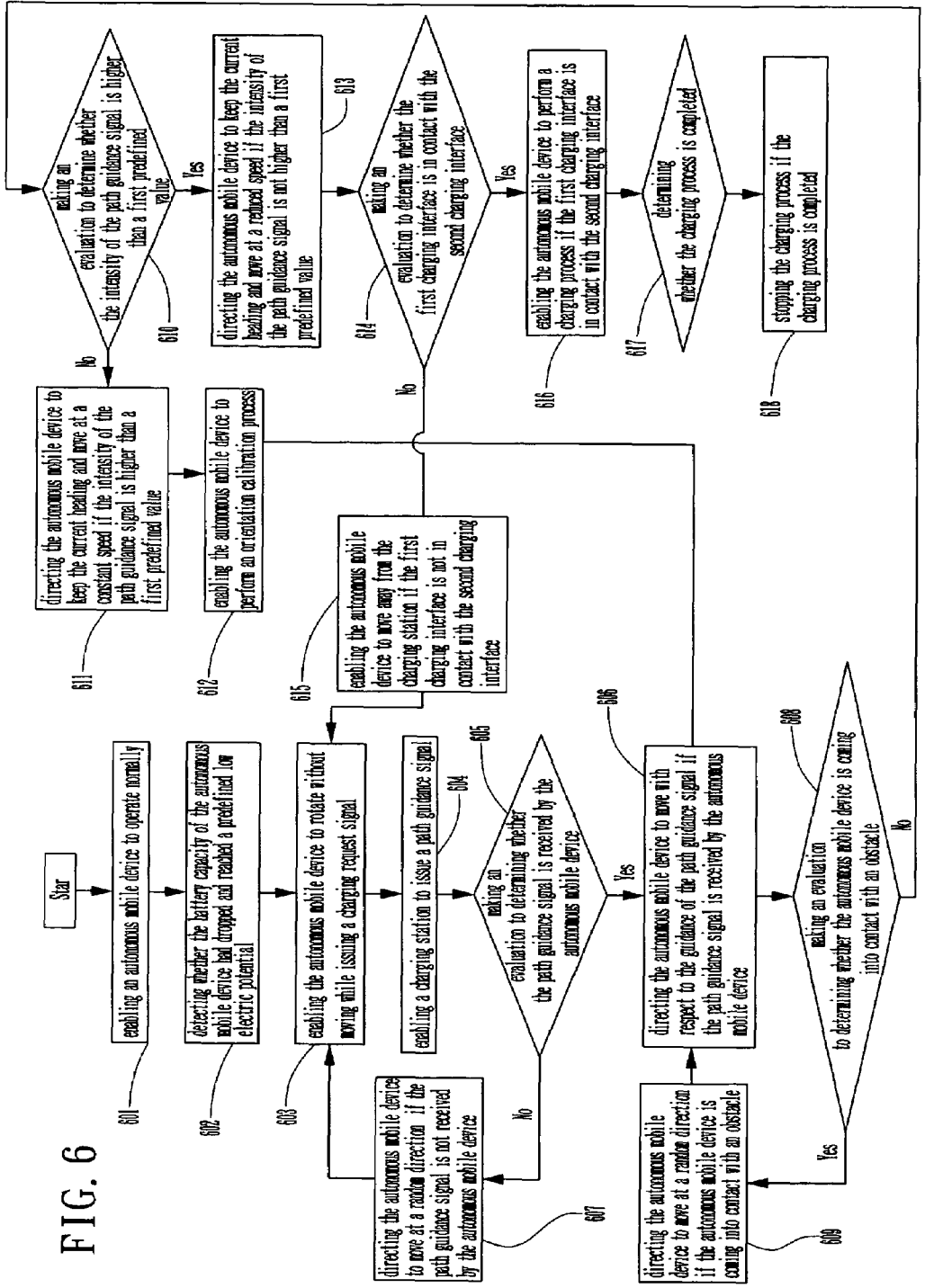
FIG. 6 is a flow chart depicting a path guidance method for autonomous mobile device according to the present invention.

In view of the disadvantages of prior art, the present invention provides a path guidance method 6 for guiding an autonomous mobile device to a move straightly toward a call unit with respect to the radio wave guidance signal issued from the call unit. The principle of the method 6 is that, since the radio wave guidance signal is an omni-directional signal with high penetrability and diffraction, it is possible for the autonomous mobile device, situated within a specific range from the call unit, to use the directional wireless reception unit thereof to evaluate and determine a moving direction pointed toward the call unit. The flow chart of the path guidance method 6 is shown in FIG. 6.

The flow of the path guidance method 6, with reference to FIG. 3 to FIG. 6, starts at step 601. At step 601, the autonomous vacuum machine 4 is enabled to operate normally, and then the flow proceeds to step 602. At step 602, the low-voltage inspection unit 44 is enabled to detect the power of the battery 43 and as soon as the detection shows that the power is dropped and reached a predefined low electric potential, the flow proceeds to step 603. At step 603, the autonomous vacuum machine 4 is controlled by the first control unit 42 to rotate without moving while enable the first wireless transmission unit 45 to issue a charging request signal, and then the flow proceeds to step 604. At step 604, the second control unit 52 of the charging station 5 is enabled to command the second wireless transmission unit 53 to issue a path guidance signal of a specific frequency as soon as the charging request signal is received by the omni-directional antenna 54 of the charging station 5, and then the flow proceeds to step 605.

At step 605, an evaluation is made to determining whether the path guidance signal is received by the directional antenna 46 of the autonomous vacuum machine 4 within a specified period of time; if so the flow proceeds to step 606; otherwise, the flow proceeds to step 607. At step 606, the autonomous vacuum machine 4 is directed to move with respect to the guidance of the path guidance signal while using the first control unit 42 to direct the rollers 48 for carrying the autonomous vacuum machine 4 to move straightly toward the charging station 5, and then the flow proceeds to step 608. At step 607, the autonomous vacuum machine 4 is directed to move at a random direction, and then the flow goes back to the step 603. It is noted that the intensity of the path guidance signal is inversely proportional to the square of distance between the charging station 5 and the autonomous vacuum machine 4, so that the directional antenna 46 is capable of being orientated to receive the path guidance signal at its maximum only from a specified direction, and thus the autonomous vacuum machine 4 is able to find a direction toward the charging station 5.

At step 608, an evaluation is made to determining whether the autonomous vacuum machine 4 is coming into contact with an obstacle; if so, the flow proceeds to step 609; otherwise, the flow proceeds to step 610. As the directional antenna 46 is capable of being orientated to receive the path guidance signal at its maximum only from a specified direction, the first control unit 42 is programmed to select the specific direction as the moving direction of the autonomous vacuum machine 4. However, since the path guidance signal is an omni-directional signal with high penetrability, the path directed by the path guidance signal may be obstructed by obstacles and thus the autonomous vacuum machine 4 can be blocked by the obstacles while traveling toward the charging station 5. Therefore, a step for maneuvering the autonomous vacuum machine 4 away from the obstruction of those obstacles is required, which is the purpose of the step 609. At step 609, the autonomous vacuum machine 4 is directed to move at a random direction to avoid the obstacle, and then the flow goes back to the step 606.

At step 610, an evaluation is made to determine whether the intensity of the path guidance signal is higher than a first predefined value, whereas the first predefined value is specified as the intensity of the received radio wave guidance signal while the autonomous vacuum machine 4 is situated at a specific distance not far away from the charging station 5; if so, the flow proceeds to step 613; otherwise, the flow proceeds to step 611. At step 611, the autonomous vacuum machine 4 is directed to keep the current heading and move at a constant speed if the intensity of the path guidance signal is higher than a first predefined value as autonomous vacuum machine 4 is still a significant distance away from the charging station 5, and then the flow proceeds to step 612. At step 612, the autonomous vacuum machine 4 is enabled to perform an orientation calibration process, that is, as the autonomous vacuum machine 4 is moving forward, the directional antenna 46 is enabled to receive the radio wave guidance signal continuously so that it is possible to calibrate the heading of the autonomous vacuum machine 4 with respect to the intensity of the received radio wave guidance signal by the control of the first control unit 42, and then the flow proceeds back to step 606. At step 613, the autonomous vacuum machine 4 is directed to keep the current heading and move at a reduced speed, and then the flow proceeds to step 614. It is noted that, if the intensity of the path guidance signal is higher than a first predefined value, the autonomous vacuum machine 4 will be at a location not far from the charging station 5 so that it is preferred to reduce the speed of the autonomous vacuum machine 4 for preventing the charging station 5 form being damaged by the collision of the autonomous vacuum machine 4.

At step 614, an evaluation is made to determine whether the first charging interface 47 of the autonomous vacuum machine 4 is in contact with the second charging interface 55 of the charging station 5; if so the flow proceeds to step 616; otherwise, the flow proceeds to step 615. At step 615, the autonomous vacuum machine 4 is enabled to move away from the charging station 5, and then the flow proceeds back to step 603. The reasoning of step 615 is that as the first charging interface 47 is not in contact with the second charging interface 55, it is concluded that the previous moving direction is erroneous and thus the autonomous vacuum machine 4 should be directed to move away from the current location so as to perform the guidance all over again. In a preferred aspect of the invention, the autonomous vacuum machine 4 is enabled to move away from the charging station 5 until the intensity of the radio wave guidance signal received by the directional antenna 46 is small than a second predefined value, whereas the second predefined value is specified as the intensity of the received radio wave guidance signal while the autonomous vacuum machine 4 is situated at a specific distance not far away from the charging station 5. However, if the first charging interface 47 is in contact with the second charging interface 55, the step 616 is performed. At step 616, a charging process is performed by the cooperation of the first control unit 42 and the second control unit 52, and then the flow proceeds to step 617. At step 617, an evaluation is made for determining whether the charging process is completed, if so, the flow proceeds to step 618. At step 618, the first wireless transmission unit 45 is enabled to issue an alert signal by the control of the first control unit 42, and as soon as the omni-directional antenna 54 of the charging station 5 receives the alert signal, the second control unit 52 will immediately issue a command to stop the charging process. Moreover, by using the second control unit 52 to detect the electricity stored in the battery 43, it is also possible to stop the charging process directly with respect to the detection of the second control unit 52.

Figure 7:
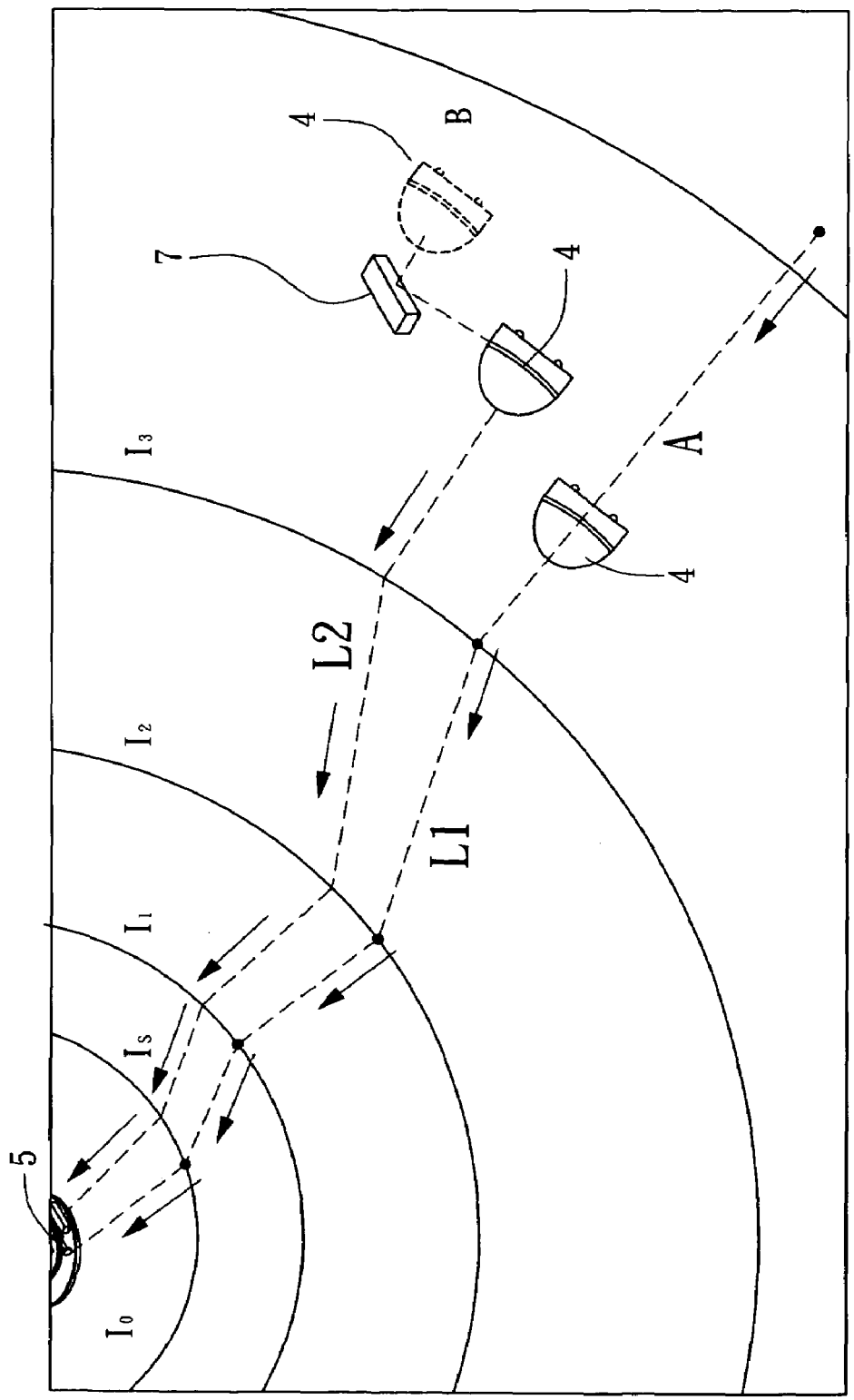
FIG. 7 is a schematic diagram showing an autonomous mobile device is directed and guided to move toward a charging station by a path guidance method of the invention.

Please refer to FIG. 7, which is a schematic diagram showing an autonomous vacuum machine 4 is directed and guided to move toward a charging station by a path guidance method of the invention. As the intensity of the path guidance signal is inversely proportional to the square of distance between the charging station 5 and the autonomous vacuum machine 4, the relation of the intensities shown in FIG. 7 can be represented as following: $I_o>I_s>I_1>I_2>I_3$, wherein $I_s$ represents an the intensity of the received radio wave guidance signal while the autonomous vacuum machine 4 is situated at a specific distance not far away from the charging station 5. Assuming the autonomous vacuum machine 4 receives a path guidance signal at the location A, it is possible to travel following the path L1. However, if the autonomous vacuum machine 4 receives an path guidance signal at the location B, the initial travel path of the received path guidance signal will guide the autonomous vacuum machine 4 to run into the obstacle 7, and thus the autonomous vacuum machine 4 will be redirect to travel following the path L2. As soon as the autonomous vacuum machine 4 moves into the range specified by $I_s$, the moving speed is reduced as it is guided to keep move toward the charging station 5 until it is in contact with the same.

The abovementioned embodiment uses a charging operation of the autonomous vacuum machine moving toward its charging station as illustration, however, the path guidance method of the invention is not limited thereby. If the call unit is simply being used as a device issuing path guidance signals for directing an autonomous mobile device to move accordingly and not providing charging service, the call unit only requires to be equipped with a wireless transmission unit and a control unit while the autonomous mobile device only requires to be equipped with a wireless reception unit, a control unit and a mobile unit. In addition, in the abovementioned embodiment, a directional antenna is used in the autonomous mobile device. However, it can be replaced by some other antenna and is not limited thereby. For instance, the directional antenna can be replaced and substituted by an omni-directional antenna having a metal shielding layer arranged at the exterior thereof while the metal shielding layer is capable of orientating the omni-directional antenna to receive the radio wave guidance signal at its maximum only from a specified direction that is not shield by the metal shielding layer.

Moreover, although the autonomous mobile device is guided to move with respect to the maximum of the intensity of the received radio wave guidance signal. However, as there is a phase difference existed between the maximum intensity and the minimum intensity of the radio wave guidance signal received by the directional antenna, it is possible to guide the autonomous mobile device with respect to the minimum of the intensity of the received radio wave guidance signal, or simultaneously with respect to the maximum intensity and the minimum intensity of the radio wave guidance signal. In addition, except for reducing the speed of the autonomous mobile device as it is moving into the range specified by the aforesaid $I_s$, the autonomous mobile device can be directed to perform other predetermined actions, such as turn or standby.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A path guidance method capable guiding an autonomous mobile device to a location specified by a call unit for enabling the autonomous mobile device to perform a predetermined operation thereat, the path guidance method comprising steps of:
   (a) enabling the autonomous mobile device to operate normally;
   (b) enabling a low-voltage inspection unit of the autonomous mobile device to detect the power of a battery of the autonomous mobile device to check if the power is dropped and reached a predefined low electric potential;
   (c) if the detection shows that the power is dropped and reaches a predefined low electric potential, controlling the autonomous mobile device by a first control unit thereof to rotate without moving while enabling a first wireless transmission unit of the autonomous mobile device to issue a charging request signal;
   (d) enabling a second control unit of the call unit to command the a second wireless transmission unit thereof to issue a path guidance signal of a specific frequency as soon as the charging request signal is received by an omni-directional antenna of the call unit;
   (e) making an evaluation to determine whether the path guidance signal is received by a directional antenna of the autonomous mobile device within a specified period of time;
   (f) if the path guidance signal is received, directing the autonomous mobile device to move with respect to the guidance of the path guidance signal while using the first control unit to direct rollers of the autonomous mobile device for carrying the autonomous mobile device to move straightly toward the call unit;
   (g) if the path guidance signal is not received, directing the autonomous mobile device to move at a random direction, the autonomous mobile device keeping rotating without moving while enabling the first wireless transmission unit of the autonomous mobile device to issue the charging request signal;
   (h) following the step (f), making an evaluation to determine whether the autonomous mobile device is coming into contact with an obstacle; if so, directing the autonomous mobile device to move at a random direction to avoid the obstacle until the autonomous mobile device can move forward without any obstacle;
   (i) making an evaluation to determine whether the intensity of the path guidance signal is higher than a first predefined value, whereas the first predefined value is specified as the intensity of the received radio wave guidance signal while the autonomous mobile device is situated at a specific distance not far away from the call unit;
   (j) if so, directing the autonomous mobile device to keep the current heading and move at a reduced speed;
   (k) if not so in the step (i), directing the autonomous mobile device to keep the current heading and move at a constant speed if the intensity of the path guidance signal is higher than a first predefined value as the autonomous mobile device is still a significant distance away from the call unit, then enabling the autonomous mobile device to perform an orientation calibration process, that is, as the autonomous mobile device is moving forward, enabling the directional antenna of the autonomous mobile device to receive the radio wave guidance signal continuously so as to calibrate the heading of the autonomous mobile device with respect to the intensity of the received radio wave guidance signal by the control of the first control unit, and the executing step proceeds back to the step (f);
   (l) following the step (j), making evaluation to determine whether the charging interface of the autonomous mobile device is in contact with the a second charging interface of the call unit; if not so, enabling the autonomous mobile device to move away from the call unit, and the executing step proceeds back to the step (c);
   (m) performing a charging process by the cooperation of the first control unit of the autonomous mobile device and the second control unit of the call unit; and
   (n) making an evaluation to determine whether the charging process is completed, if so, enabling the first wireless transmission unit of the autonomous mobile device to issue an alert signal by the first control unit of the autonomous mobile device, and as soon as the omni-directional antenna of the call unit receives the alert signal, immediately issuing a command by the second control unit of the call unit to stop the charging process.

2. The path guidance method of claim 1, wherein the call unit is configured with a charging station.

3. The path guidance method of claim 1, wherein the directional antenna is an antenna selected from the group consisting of a Yagi antenna, a horn antenna, and a panel antenna.

4. The path guidance method of claim 1, wherein the omni-directional antenna having a metal shielding layer arranged at the exterior thereof while the metal shielding layer is capable of orientating the omni-directional antenna to receive the radio wave guidance signal at its maximum only from a specified direction.

* * * * *